Figure 1:
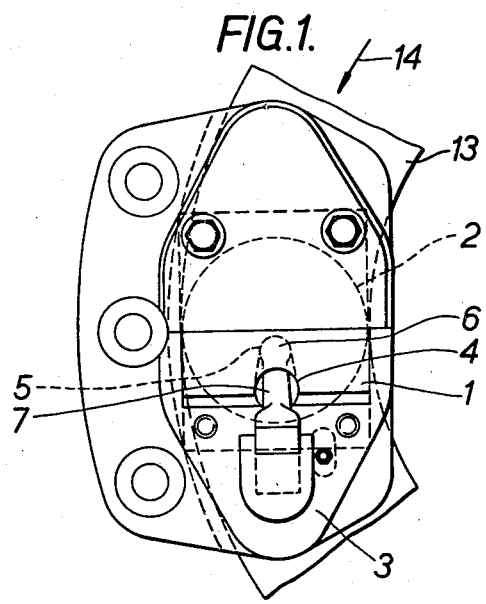

May 25, 1965　　　J. G. DOUGLAS　　　3,185,258
SPOT-TYPE, SERVO DISC BRAKE

Filed April 9, 1962　　　2 Sheets-Sheet 1

INVENTOR
JOHN GEORGE DOUGLAS
By: Norris + Bateman
attys

May 25, 1965 J. G. DOUGLAS 3,185,258
SPOT-TYPE, SERVO DISC BRAKE
Filed April 9, 1962 2 Sheets-Sheet 2

INVENTOR
JOHN GEORGE DOUGLAS

By: Norris & Bateman
Attys

United States Patent Office 3,185,258
Patented May 25, 1965

3,185,258
SPOT-TYPE, SERVO DISC BRAKE
John G. Douglas, Dirgarve, Aberfeldy, Scotland, assignor to Dunlop Rubber Company Limited, London, England, a British corporation
Filed Apr. 9, 1962, Ser. No. 186,256
9 Claims. (Cl. 188—73)

This invention relates to a vehicle disc brake assembly of the kind including a brake disc, rotatable with a vehicle wheel or its driving transmission, a friction element located in a non-rotatable brake support which is preferably of the caliper-type straddling a portion of the periphery of said disc, and an axially movable, circumferentially fixed thrust device acting on said friction element in a direction at right angles to the plane of said brake disc to urge said friction element towards the brake disc.

The object of the invention is to provide such an assembly with self-servo action, whereby the pressure exerted by the friction pad upon the rotating disc is automatically increased during braking without resort to auxiliary servo-devices.

Accordingly the present invention comprises a disc brake assembly of the kind described wherein the friction element is movable by said axially-movable, circumferentially-fixed thrust device in a direction perpendicular to the braking surface of the disc to apply said brake, said friction element also being capable of independent circumferential movement relative to said thrust device as a result of the drag of a rotating disc and wherein a strut has one end associated with the leading edge of the friction element and the other end associated with said non-rotatable brake support and is positioned obliquely to the plane of the disc in such a manner that when the brake is applied the friction element is constrained to move in on oblique or arcuate direction towards the disc thereby to provide a self-servo action.

Such a strut can operate as a spragging member to intensify the braking pressure exerted by the thrust device.

Preferably said thrust device is a piston of a piston and cylinder mechanism and may include a piston skirt or stem or similar component which is rigidly secured to or forms an integral part of said piston.

Preferably also the friction element is a pad of friction material with or without a backing plate or carrier to which it may be secured.

The degree of self-servo action produced by this arrangement is dependent upon the angle θ between the face of the disc and a line passing through the points of engagement of the strut with the friction element and brake support.

It has been found, however, that as the friction element wears the angle θ increases, causing a consequent increase in the self-servo action to an undesirable value. On the other hand if, in order to diminish the effect of wear, the initial angle θ is reduced in value the self-servo action is so reduced as to be of little or no material advantage in the initial stages of pad wear. Also, if the friction elements wear unequally on the four or more wheels of the vehicle there is undesirable and dangerous inter-wheel brake inconsistency, due to the varying degrees of servo-action.

Accordingly the present invention also comprises a disc brake assembly wherein the end of said strut remote from the friction element is adapted for rolling engagement against a part of said non-rotatable brake support which is inclined obliquely to the plane of the disc, in the opposite sense to the inclination of the strut, in such a manner that the strut progressively rolls during the wear life of the friction element to maintain the servo angle θ constant.

The strut, in this aspect of the invention, does not act as a spragging member.

Figure 2:
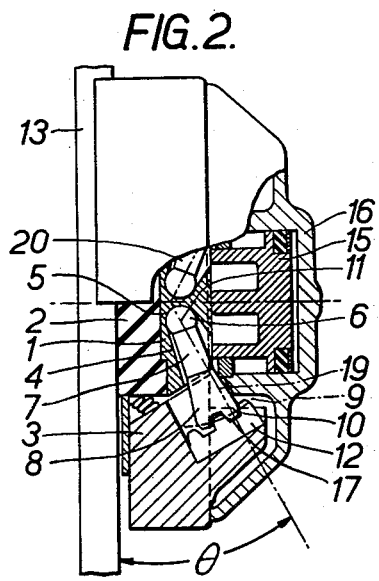
Figure 3:
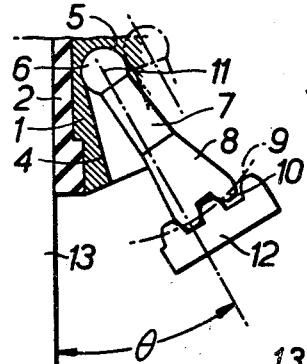
Figure 4:
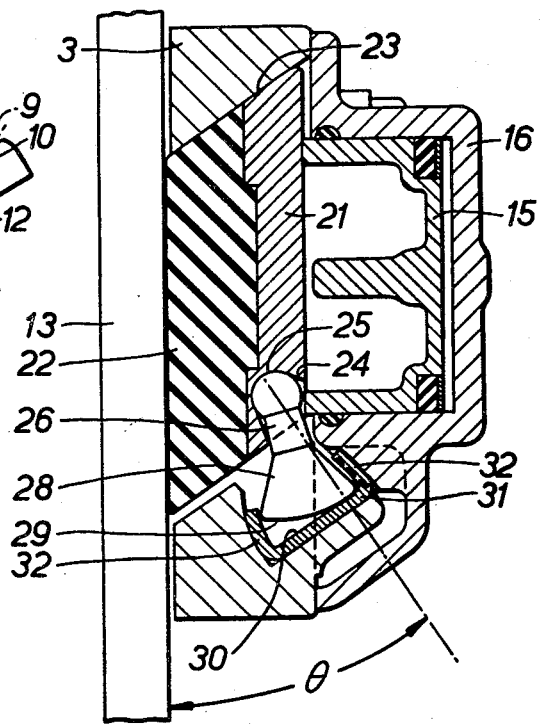
Figure 5:
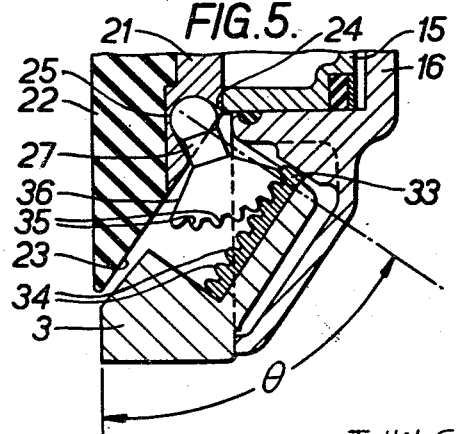

The invention will be further described with reference to the accompanying drawings in which FIGURE 1 is a side elevation of part of a disc brake with the brake cylinder and piston removed, FIGURE 2 is an end elevation, partly in section, of one side of the brake of FIG. 1 with the brake cylinder and piston restored, FIGURE 3 is an enlarged view of a detail of FIG. 2 showing in broken and full lines the position of the strut when the friction element is new and worn-out respectively, and FIGURES 4 and 5 are enlarged sectional views of modified forms of the apparatus shown in FIG. 2.

It will be understood that the constructions now to be described are duplicated on the opposite side of the brake disc except in those brake assemblies in which the brake operating means are provided in one arm only of the brake caliper and the friction element in the other arm of the caliper is moved into engagement with the brake disc by reaction.

Referring to FIGS. 1 to 3 a square or rectangular carrier 1 for a circular friction pad 2 or one of any other suitable shape is guided on two edges in one arm 3 of a non-rotatable brake caliper and is recessed at 4 to form a seat 5 for the spherical end 6 of a strut 7, the other end of which takes the form of a toothed sector 8, the pitch circle 9 of the teeth 10 of which is struck from the centre 11 of the end 6. The teeth 10 mesh with and roll on a rack 12 extending tangentially of the pitch circle 9 of the teeth 10 and fixedly mounted in the caliper arm 3 of the brake at a point in advance of the pad 2 in the direction of rotation of the brake disc 13 as indicated by the arrow 14. Due to the presence of the strut 7, braking pressure exerted on the carrier 1 through the hydraulic piston and cylinder device 15, 16 to move the friction pad 2 into pressure contact with the face of the rotating brake disc 13 swings the carrier about a point 17 on the rack 12, the line 19 from which to the centre 11 of the end 6 of the strut lies at a suitable angle θ to the face of the disc 13 and normal to the rack. The pad 2, carrier 1 and end 6 of the strut 7 tend to be carried round with the disc 13 and as a consequence tend to be swung still further about the point 17 towards the disc, thus automatically increasing the pressure exerted by the pad upon the face of the disc without any increase in the hydraulic pressure exerted upon the carrier. At the same time the movement towards the disc 13 of the end 6 of the strut 7 causes its sector 8 to roll on the rack 12 shifting its point of engagement with the rack towards the disc through the same distance as that through which the end 6 has moved. This point of engagement will be progressively adjusted with pad wear until the pad 2 is worn-out, at which time the strut 7 will have reached the position shown in full lines in FIG. 3. In each new position of the strut 7 the line joining its point of engagement with the rack 12 to the centre 11 of its end 6 remains substantially parallel to the line 19 passing through the initial point of engagement 17 and the angle θ thus remains substantially constant. It is of course necessary, to obtain the feature of constant servo angle, that the part of the non-rotatable brake support on which the end of the strut makes rolling engagement should itself be inclined obliquely to the surface of the disc, in the opposite sense to the inclination of the strut. The effective axis of the strut and the said oblique surface are of course at right angles to one another and conveniently the said surface is inclined to the braking surface of the disc at an angle of the order of 45°.

As partly shown in FIG. 2 an oppositely extending strut 20 identical with the strut 7 is mounted in the caliper arm 3 on the other side of the carrier 1 and cooperates with a rack (not shown) similar to the rack 12 to provide self-servo assisted braking during reverse rotation of the brake disc 13.

In the embodiment shown in FIGS. 4 and 5 a cylindrical carrier 21 for a cylindrical friction pad 22 or one of any other suitable shape within the confines of the face of the carrier is situated in a correspondingly shaped bore 23 in the arm 3 of the brake caliper to minimize the passage of dirt and moisture past the carrier and pad from the disc, without subjecting the bore wall to any braking reaction, and is recessed at 24 to form a seat 25 for the spherical end of a strut 26 (FIG. 4) or 27 (FIG. 5). The sector-shaped end 28 of the strut 26 has a smooth surface 29 which rolls on the flat surface 30 of a bar 31, having end flanges 32, which replaces the rack 12. In the embodiment of FIG. 5 the rack 12 is replaced by a rack 33 having an increased number of teeth 34 engaged by teeth 35 on the sector-shaped end 36 of the strut 27.

In place of the single strut described above two suitably spaced struts and two racks or bars may be provided for use in forward rotation of the brake disc 13 and, in the embodiment of FIGS. 1 to 3, the same or a single strut and rack or bar for use in reverse rotation of the disc. In the latter case the spherical end of the single strut may be arranged between those of the other struts and all three located along the mid-line of the friction pad to give the latter true balance during braking.

It will be evident that the struts shown and described each consist of a modified sector of a toothed or plain wheel or roller the axis of which coincides with the end in engagement with the friction pad carrier, which end is shown and described as being spherical but may be of any other form capable of permitting the necessary relative movement in one plane between that end and the pad carrier.

The invention is not limited to the forms of pad, pad carrier and caliper bore therefore described and shown in the specification and drawings since these may be varied as desired within the terms of the appended claims. One advantageous form is that which provides a contact-face on the brake-disc of truncated-wedge or trapezoidal shape.

I claim:
1. A disc brake assembly comprising a rotatable brake disc drivably associated with a vehicle wheel, a non-rotatable brake support, a friction element located in said non-rotatable brake support, and a thrust device associated with said friction element, said thrust device being circumferentially fixed and axially movable to apply pressure to said friction element in a direction at right angles to the plane of said disc to urge said friction element towards the disc, said friction element also being capable of independent circumferential movement relative to said thrust device as the result of the drag of the rotating disc, said brake assembly comprising a strut disposed obliquely to the plane of the disc in a plane transverse to the radial direction of the adjacent portion of the disc, said strut being positioned at one end to engage said friction element and at the other end in rolling engagement with a part of said non-rotatable brake support which is inclined obliquely to the plane of the disc in the opposite sense relative to the inclination of the strut, whereby the strut will progressively roll on said part during the wear life of the friction element to maintain at a constant value the angle which the strut makes with the plane of the disc.

2. A disc brake assembly according to claim 1 wherein the end of the strut remote from the friction element is in the form of a toothed sector, the pitch circle of the teeth of the sector being struck from the pivotal centre of the end of the strut associated with the friction element, and said part of said brake support on which said sector rolls is a rack meshing with said sector.

3. A disc brake assembly according to claim 1 wherein the end of the strut remote from the friction element is in the form of a sector having a smooth surface the profile of which is in the form of an arc of a circle struck from the pivotal centre of the end of the strut associated with the friction element, and said non-rotatable brake support has a substantially flat supporting surface on which said smooth surface of said section is in rolling contact.

4. A disc brake assembly according to claim 1 wherein a second strut is provided, said second strut being associated at one end witth the trailing edge of the friction element and being disposed obliquely to the plane of the disc in the opposite direction to said first mentioned strut associated with the leading edge of said element, said second strut being associated at its other end with the non-rotatable support, whereby said second strut provides self-servo assisted braking during reverse rotation of the braking disc.

5. A disc brake assembly according to claim 4 wherein two struts are associated with the leading edge of said friction element, for use in forward rotation of the brake disc.

6. A disc brake according to claim 5 wherein the end of said second strut associated with the friction element is arranged between those of the forward struts along the mid-line of the friction element.

7. A disc brake according to claim 5 wherein two struts are provided for use during reverse rotation of the brake disc.

8. A disc brake according to claim 1 wherein the end of the strut associated with the friction element is of spherical form.

9. A disc brake assembly according to claim 1 wherein the end of the strut associated with the friction element is seated in a recess formed in a friction pad carrier.

References Cited by the Examiner

UNITED STATES PATENTS 2,256,725 9/41 Pierce et al. _____ 188—72
2,655,230 10/53 Buyze _____ 188—152 X
2,849,088 8/58 Burnett _____ 188—72 X

FOREIGN PATENTS 788,841 1/58 Great Britain.

EUGENE G. BOTZ, *Primary Examiner.*

ARTHUR L. LA POINT, *Examiner.*